March 24, 1959     M. E. IVY     2,878,928
CONTAINER FOR PACKAGING PILLS, ETC
Filed April 30, 1956

INVENTOR.
MARY ELLEN IVY
BY
R. L. Miller
ATTORNEY

United States Patent Office 2,878,928
Patented Mar. 24, 1959

2,878,928

CONTAINER FOR PACKAGING PILLS, ETC.

Mary Ellen Ivy, Cuyahoga Falls, Ohio, assignor to The Goodyear Tire & Rubber Company, Akron, Ohio, a corporation of Ohio Application April 30, 1956, Serial No. 581,705

1 Claim. (Cl. 206—56)

This invention relates to a container for packaging pills and the like. The pills may be dispensed from the container one at a time, or two or more at a time. There is convenient access to the pills which are delivered from the container enclosed in tubing. The tubing keeps the pills clean, and depending upon its composition protects them from moisture, etc. Also they are protected against breakage and are easily handled.

The pills are packaged in tubing of oriented plastic film which is enclosed in a container. There is an opening in the container through which the tubing is withdrawn, and there preferably is a clip with a cutting edge fastened to the outside of the container near the opening so that the tubing may be cut to the length required to deliver one or more of the pills, as desired.

Oriented film is plastic film which has been stretched and will shrink on heating. Although the film is ordinarily called "oriented" in the trade, it is equally well described as being "heat shrinkable." The film is stretched while warm, and then cooled while retained under tension, so that it is in a state of unstable equilibrium. On heating, the film shrinks to dimensions approaching those it possessed before stretching.

The pills may be placed in the tubing as it is made, or after it is completed. Then the tubing is heated and shrinks on to the pills and between each two adjacent pills, and the pills are held in place in spaced relation to one another. If the pills are to be taken two or more at a time, the number required for a single dosage may be grouped together and spaced from those required for a subsequent dosage. If different pills are to be taken alternately, alternate pills in the tubing will be of different composition.

The tubing with the pills in it may be placed in the container in any one of several ways. For example, the tubing may be rolled up so that it substantially fills a flat container, and can be removed, little by little, as required, through an opening located either at about the center of one of the flat surfaces of the container or at the periphery of the container. Alternatively, the tubing may be folded on itself, back and forth, any number of times until it fills a flat container from one side thereof to the other.

There are various types of cutting devices that may be used for cutting a desired length from the outer end of the tubing, whether it contain a single pill or several pills. When a length of the tubing has been cut off, the pill or pills within it may be forced out of either end of it by squeezing the tubing over the pills and thus causing them to move toward and then out of an open end.

The container may be designed to hold as few as ten or less of the pills, or it may hold as many as a hundred or more.

The invention is further described in connection with the accompanying drawings, in which—

Figure 1:
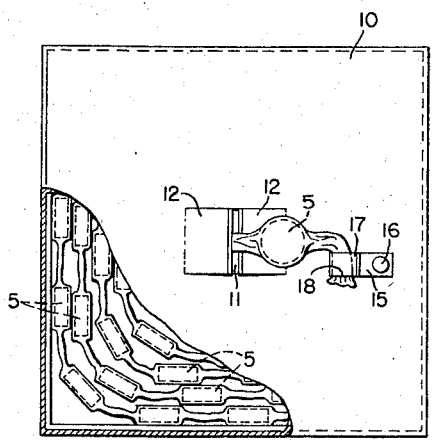
Fig. 1 is a plan view of a container, partly broken away to show the tubing with pills in it, and with one end of the tubing extending through an opening at the center of the upper side of the container.

The pills may be of any size and shape. Although the container is designed particularly for packaging medical pills, it may be used equally well or bluing tablets, bouillon cubes, etc. In the drawings the pills 5 are illustrated as being relatively flat and circular.

Figure 3:
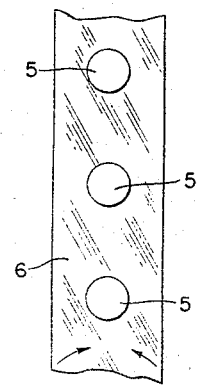
Fig. 3 shows the oriented film on a flat surface with the pills on it before forming the tube around them.
Figure 4:
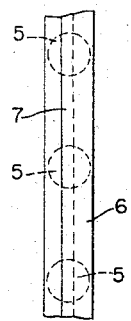
Fig. 4 shows the film folded over the pills to form the tubing.
Figure 5:
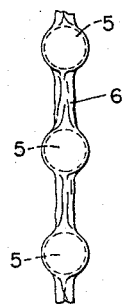
Fig. 5 is a view of the tubing after it has been shrunk on to the pills.

The tubing may be extruded, in which case it may be inflated with a gas under pressure as it is extruded in order to stretch or orient it radially. The drawings show tubing made of flat, oriented film 6. Fig. 4 shows how the opposite edges of the flat film are folded to the center. These edges are sealed to one another by heat, and preferably at the same time that the oriented film is shrunk. This is preferably done by blowing hot air against the film. The arrows in Fig. 3 indicate that when heated, the film will shrink circumferentially of the tubing. By having the overlapped edges 7 on the top of the tube when it is blown with hot air, these edges will be softened and pressed to one another and thus sealed simultaneously with the radial shrinkage of the tubing. The film may be stretched longitudinally as well as laterally, and will then shrink longitudinally as well as radially when heated, but no added advantage is seen in using such film.

The film illustrated in the drawings is a rubber hydrochloride film which has been stetched laterally. It may, for example, be 0.0004 inch thick and be stretched to 200 percent, or 400 or more percent of its original area.

Figure 2:
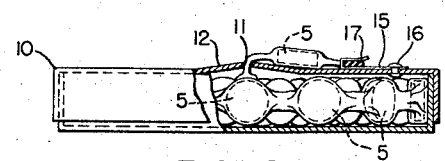
Fig. 2 is an elevation of the package, partly broken away.

Figures 1 and 2 show the tubing of pills after shrinking, coiled in the container 10. This container may be made of ordinary chipboard, or it may be made of stiff flexible paper or plastic. There is a slot opening 11 at about the center of one flat side which is just large enough for a pill. On drawing the tubing through this slot the pill in the tubing entering the slot from the underside widens the slot sufficiently to allow it to be drawn through the slot. The slot is reinforced with the stiff paper patches 12. Fig. 2 shows how the edges of the slot are pulled upwardly to permit the pills to slip through the slot, one at a time.

The shape of the opening will be determined by the shape of the pills. For instance, for spherical pills a round opening will be best.

The metal clip 15 is fastened to the container by the rivet 16. The clip is fashioned from a narrow flat strip which has sufficient spring so that the folded-back end 17 holds the end of the tubing tightly, yet releasably. The edge 18 of the folded-back end 17 is a cutting edge. It may be serrated.

In order to remove one or more pills, the end of the tubing is removed from the grip of the clip 15, a desired length of the tubing is pulled from the container, the tubing is again fastened in the clip, and the end of the tubing which contains at least one pill is cut off by pulling the end of the tubing against the cutting edge 18. Then by squeezing the cut-away length of the tubing against one of the pills within it, the pill is forced toward an open end of the tubing and then out of it. Alternatively, the short length of cut-away tubing may be cut or torn longitudinally to free the one or more pills within it. This removal of short lengths from the end of the tubing is repeated from time to time as long as the pills last.

The pill manufacturer may make the package complete. Alternatively, the druggist or other retailer may store empty containers and rolls or other fillers of pill-filled tubing. When a certain kind of pill is ordered, he will insert in the container a filler containing pills of this kind. He or the purchaser will then thread the end of the tubing through the opening and catch it in the clip.

The shape of the pills is not important. The outer container may be composed of any suitable material and be of any suitable design. The oriented film used for the tubing will be selected from the wide variety on the market.

The invention is defined in the claim which follows.

What I claim is:

A relatively flat container formed with two substantially parallel large flat surfaces, an opening near the center of one of said surfaces, a plurality of pills in the container in spaced relation in tubing of oriented film, one end of the tubing being in the opening and fastened under a clip formed with a cutting end, the clip being fastened on the outside of the container near the opening, the tubing being shrunk onto and between the pills and being rolled up in the container on an axis perpendicular to said flat surfaces.

References Cited in the file of this patent

UNITED STATES PATENTS

| | | |
|---|---|---|
| 1,208,701 | Trenner | Dec. 12, 1916 |
| 1,386,398 | Davis | Aug. 2, 1921 |
| 2,141,318 | Salfisberg | Dec. 27, 1938 |
| 2,195,740 | Salfisberg | Apr. 2, 1940 |
| 2,323,639 | Schwartzman | Feb. 18, 1941 |
| 2,574,565 | Hough et al. | Nov. 13, 1951 |
| 2,758,710 | Arens | Aug. 14, 1956 |
| 2,771,214 | Lefebvre | Nov. 20, 1956 |